Patented Dec. 24, 1946

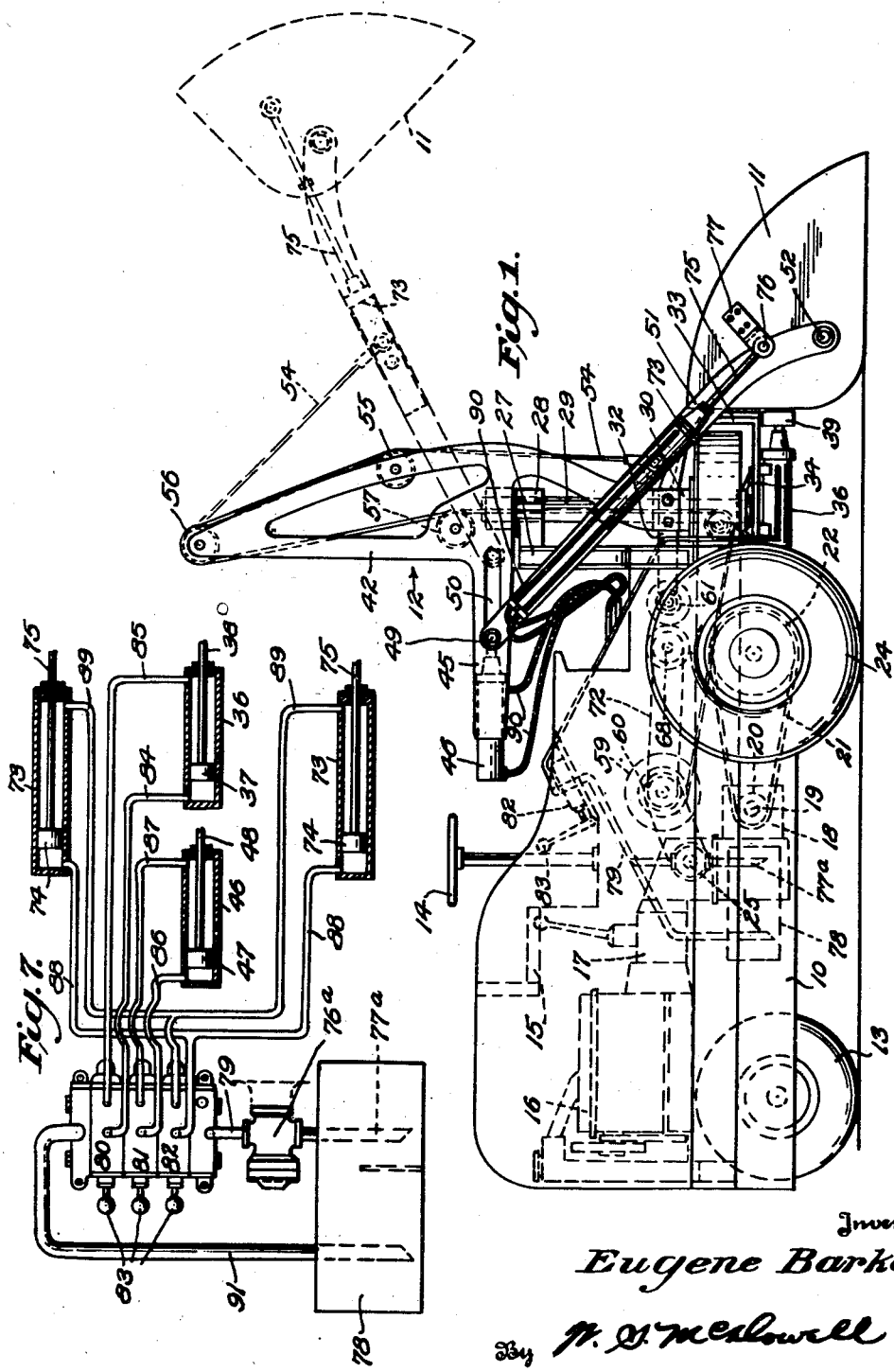

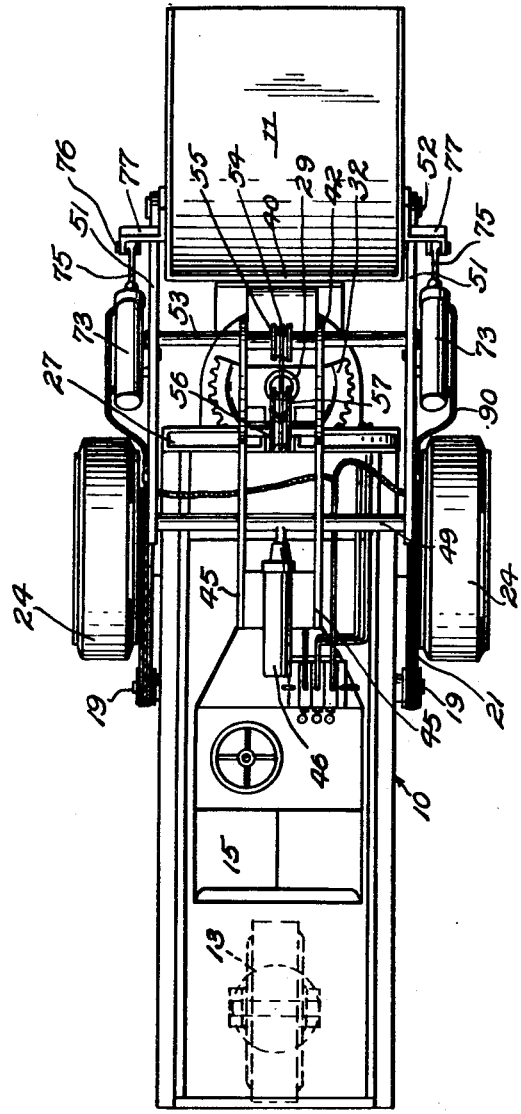

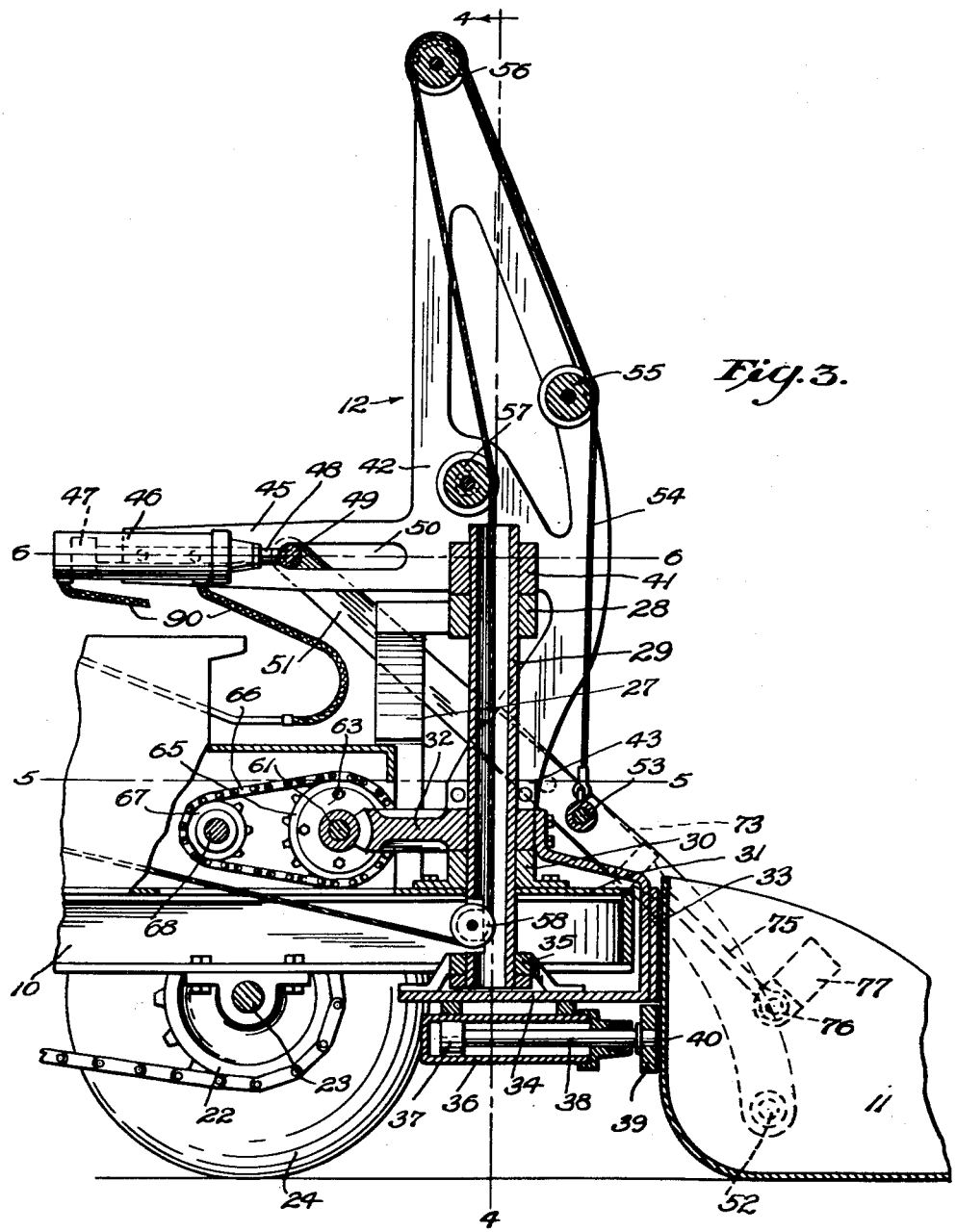

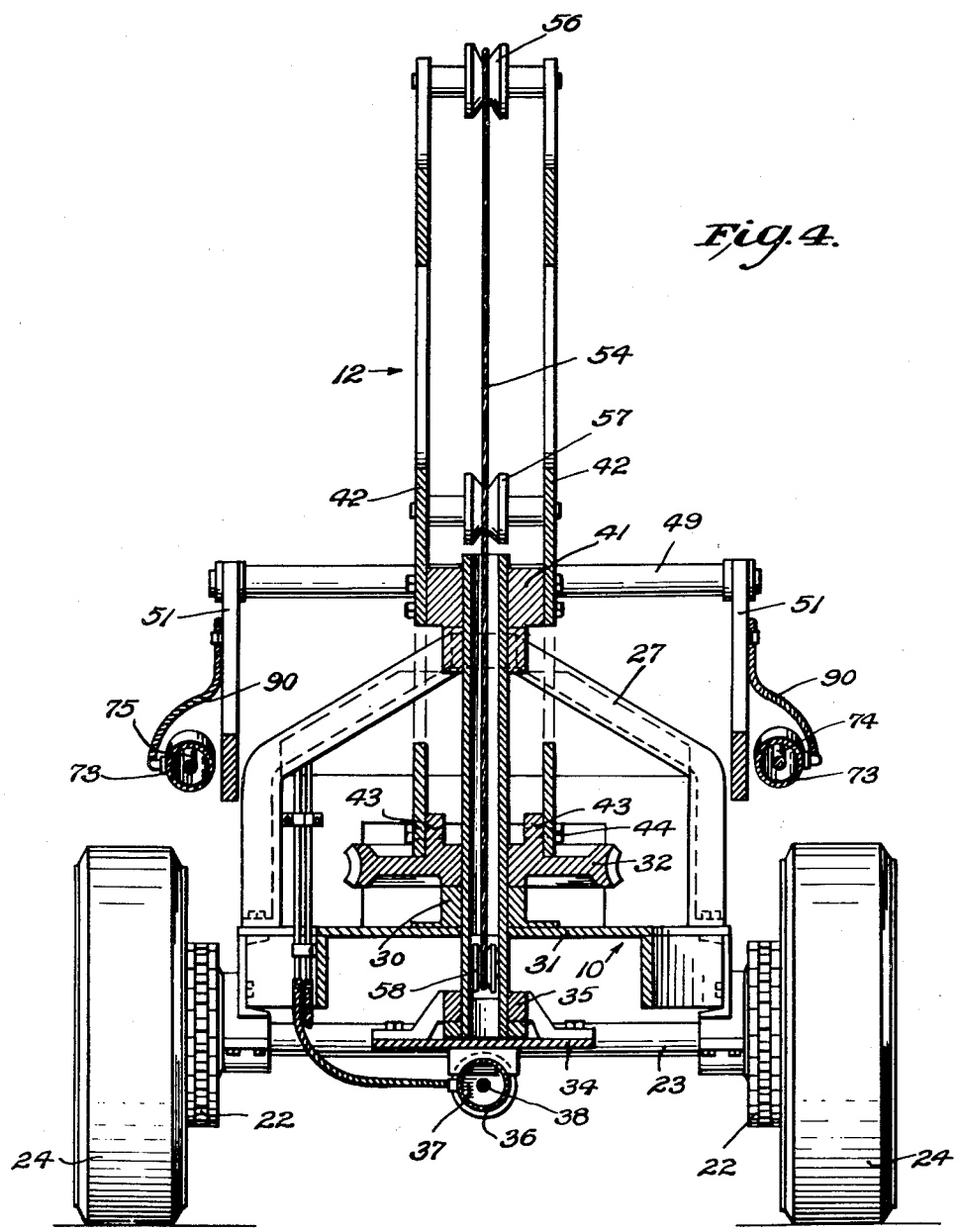

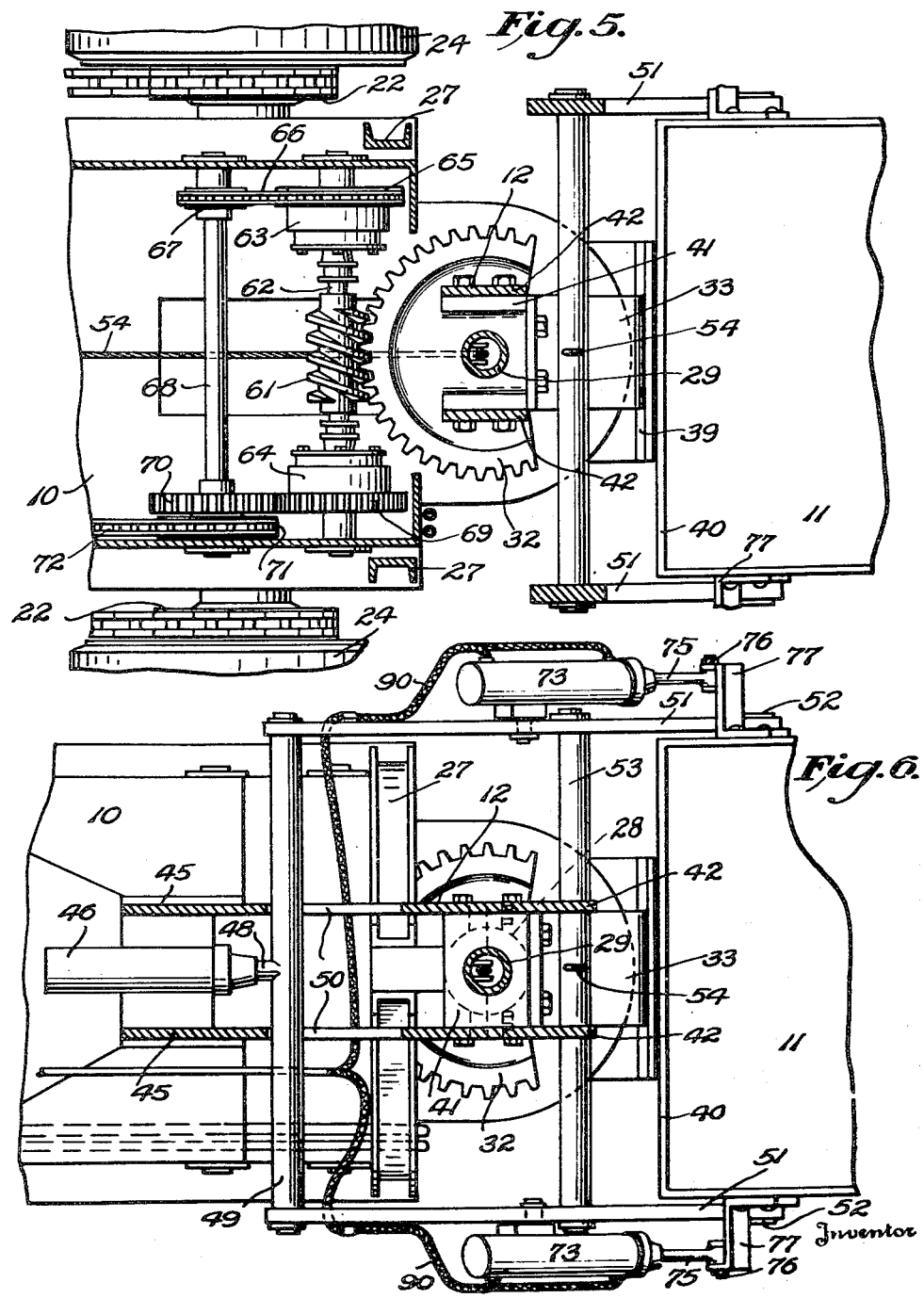

2,413,096

UNITED STATES PATENT OFFICE 2,413,096

PORTABLE LOADING MACHINE

Eugene Barker, Columbus, Ohio, assignor to The Jaeger Machine Company, Columbus, Ohio, a corporation of Ohio Application September 23, 1944, Serial No. 555,426

7 Claims. (Cl. 214—148)

This invention relates to loading machines and, more particularly, to loading machines of the type utilizing an automotive base vehicle having mounted on one end thereof a power actuated scoop, or other form of loader, adapted for swinging movement about vertical and horizontal axes for receiving, lifting and laterally turning to discharge positions materials contained in the scoop or loader.

It is an object of the invention to provide a loading machine of this character wherein improved power actuated means, under the convenient control of the machine operator, are provided for advancing or thrusting the scoop when in a lowered position into the material to be loaded, thereafter swinging the scoop in vertical and horizontal arcs to cause it to assume a desired position of horizontal elevation and material discharge, and then producing turning movement of the scoop so that it will be downwardly tilted to provide for the gravitational discharge of materials contained therein.

It is another object of the invention to provide a loading machine of this nature with improved hydraulic mechanism for forcing the scoop forwardly into the materials to be gathered and elevated, and for tilting the scoop after the same has been elevated to its material-discharging position, all these operations being under the convenient regulation of the machine operator through the actuation of controls grouped within convenient reach of the operator's position.

It is another object of the invention to provide a loading machine of the type set forth characterized by the simplicity of its mechanical construction, the ease by which its operation may be governed, and its compact and sturdy mechanical design which renders the machine adaptable for hard usage and extended service without mechanical failure.

For a further understanding of the invention, reference is to be had to the following description and the accompanying drawings, wherein:

Fig. 1 is a side elevational view of a loading machine formed in accordance with the present invention, the material-handling scoop of the machine being shown in full lines in its lowered position and broken lines in its elevated position of material discharge;

Fig. 2 is a top plan view of the loading machine;

Fig. 3 is a detail vertical longitudinal sectional view taken through the front end of the machine;

Fig. 4 is a vertical transverse sectional view taken through the front end of the machine on the plane indicated by the line 4—4 of Fig. 3;

Fig. 5 is a horizontal sectional view on the plane indicated by the line 5—5 of Fig. 3;

Fig. 6 is a similar view on the line 6—6 of Fig. 3.

Fig. 7 is a diagrammatic view disclosing the fluid-actuated rams and their associated controls.

Referring more particularly to the drawings, the numeral 10 designates the chassis or frame of my improved loading machine, the numeral 11 designates the material-handling scoop, shovel or other load carrier, and the numeral 12 designates the turnable mast employed in the raising and lowering of the scoop and the turning thereof horizontally to desired positions of material discharge.

The mast is carried by the frame 10 at its forward or material-attacking end. The opposite or rear end of the frame is provided with a ground-engaging steering wheel 13. This wheel is disposed in the center of the frame and is turnable about a vertical axis so that the machine may be turned in circles of small radii. Such steering movement of the wheel 13 is effected by the customary manually operated control wheel 14 provided on the machine contiguous to the operator's position 15.

Suitably supported by the chassis or frame at the rear end of the machine is a power plant 16, ordinarily an internal combustion engine, and associated with the same is the usual clutch and change-speed transmission 17, the latter being of the type having four forward speeds and a reverse, and having associated therewith a differential 18, all of standard construction. The differential includes cross shafts 19 carrying sprocket wheels 20, around which there are trained endless chains 21, the latter being also passed over sprockets 22 fixed upon the axles 23 of a pair of forwardly located ground-engaging traction wheels 24. These wheels are arranged on opposite sides of the frame 10, as shown in Fig. 4, in order to sustain adequately the loads imposed thereon by the mast 12 and scoop 11, and to enable the wheels to exert high tractive effort in advancing the scoop into the materials to be loaded.

At its front or material-attacking end, the frame 10 of the machine is provided with a vertically disposed mast-supporting frame 27. This frame possesses a wishbone configuration and terminates at its upper end in a bearing 28 for the reception of the upper end of a tubular column 29. This column is also rotatably received intermediately of its length in a bearing 30 mounted on the bed plate 31 of the frame 10, and secured to said column immediately above the bearing 30 is a horizontally disposed worm gear segment 32.

Attached to the forward portion of the hub of this segment is a bracket 33 shaped to project around the front of the frame 10, immediately to the rear of the scoop 11, the lower portion of the bracket being terminated in a horizontal shelf 34 carrying a bearing 35 for the reception of the lower end of the column 29. The under part of the shelf 34 carries a fluid pressure cylinder 36 in which is mounted for reciprocation a piston 37 having an externally projecting piston rod 38. The outer end of this rod is equipped with a pressure bar 39 disposed to engage the vertical back wall 40 of the scoop 11, so that when a fluid under pressure is admitted into the cylinder 36, the consequent forward advance of the piston 37 therein will cause the pressure bar 39 to push the scoop forwardly into the material to be gathered and lowered when the scoop 11 is disposed on the ground, or other material-supporting surface.

As a part of the mast structure, the upper end of the column 29, above the bearing 28, carries a block 41 to which is attached on opposite sides of the column a pair of spaced substantially vertically disposed mast plates 42, the lower ends of these plates being bolted or otherwise secured as at 43 to flange extensions 44 provided on the gear segment 32, whereby the mast turns with said segment about the vertical axis of the column 29.

The plates 42 are formed to provide rearwardly directed, substantially horizontally disposed extensions 45 which effect the support of a hydraulic cylinder 46. In this cylinder there is mounted a piston 47 carrying an externally projecting piston rod 48. The outer or forward end of this rod is joined with a horizontally disposed transversely extending rod 49, the latter being slidably mounted in elongated slots 50 formed in the plate extensions 45. The outer ends of the rod 49 pivotally receive the upper ends of a pair of forwardly and normally downwardly directed scoop arms 51. The forward or lower ends of these arms are pivotally connected with horizontally extending trunnions 52 mounted on the opposite side walls of the scoop 11. Consideration will disclose that when a fluid under pressure is admitted into the cylinders 36 and 46 in a direction to move the pistons therein forwardly, the scoop, when in the lowered position disclosed in Fig. 3, will be thrust into the materials to be gathered, thereby filling the scoop with such materials. This operation may take place independently of or in conjunction with the forward movement of the base vehicle itself as obtained by the tractive effort of the ground wheels 24.

After the scoop has been thus filled with the materials undergoing gathering and loading, the same is swung upwardly in a vertical arc by the raising of arms 51. Conveniently, such raising may be accomplished by providing the arms 51 with a transversely extending rod 53 with which is connected the outer end of a flexible cable 54. From the rod 53, the cable is trained upwardly, passing over guide sheaves 55, 56 and 57 carried by the mast plates 42. The guide sheave 57 is disposed over the open upper end of the column 29, and from said guide sheave, the cable passes downwardly through said column and is trained around a guide sheave 58 provided in said column adjacent to its base. From the guide sheave 58, the cable is trained rearwardly of the base vehicle and is wrapped around and secured to a drum 59 rotatably supported on the frame 10, the said drum being driven, as at 60, from the power take-off shaft 25 under suitable clutch control. Manifestly, when the drum 59 is rotated to wind the cable thereabout, the shortening of its effective length causes the same to rock the arms 51, thereby elevating the scoop 11 to, for example, the dotted line position disclosed in Fig. 1.

To avoid excessive manipulation of the base vehicle, it is often quicker and more desirable in discharging the load of the scoop to swing the same horizontally to a position somewhat lateral to the base vehicle, as in instances where an automotive truck is positioned at the side of the base vehicle and into the body of which the contents of the scoop are to be discharged. Such horizontal swinging movement is effected by rotating the worm gear segment 32, so that the mast connected therewith revolves about its vertical axis. The rotation of the gear segment is accomplished by the provision of a worm 61, which meshes with the teeth of said segment. The worm is mounted on a rotatably supported shaft 62 in association with disk clutches 63 and 64. The clutch 63 carries a sprocket 65 over which is trained an endless chain 66, the latter being also trained over a sprocket 67 carried by a rotatably journaled countershaft 68. The clutch 64 is provided with a gear 69 which meshes with a corresponding gear 70 also fixed on the countershaft 68.

By selectively operating the clutches 63 and 64, the worm 61 may be rotated in either direction in order to produce desired rotation on the part of the gear segment 32, swinging the scoop either to the right or left of the center of the base vehicle. Since the cables pass downwardly through the tubular column 29 which forms the axis of turning movement of the mast, it is apparent that such turning movement does not interfere with the action of the cable. The countershaft is provided with a sprocket 71 having trained thereover an endless chain 72 which leads to a second sprocket driven by the power take-off 25.

In order to oscillate the scoop about its trunnions 52 so that the bottom of the scoop may be tilted downwardly to assume a material-discharging position, as indicated by dotted lines in Fig. 1, the arms 51 carrying fluid pressure cylinders 73, in which are slidably mounted pistons 74. These pistons are provided with exteriorly projecting piston rods 75, which have their forward or outer ends pivotally united as at 76 with brackets 77 carried by the sides of the scoop 11. It will be evident that when fluid under pressure is admitted into the cylinder 73 to advance the piston 74 in a forward direction, the scoop will be rocked or tilted about its trunnions 52 and caused to assume the inclined position shown in the drawings. This operation provides for the rapid discharge of the loaded materials contained on the scoop, and eliminates the use of trips or latches which are often the source of mechanical difficulties in prior apparatus.

As shown in Fig. 7, the power take-off is utilized to operate a hydraulic pump 76ᵃ. The inlet pipe 77ᵃ of this pump projects beneath the level of a body of liquid contained in an accumulator tank 78. The discharge pipe 79 of the pump leads to the common inlet of a plurality of manually operated valves 80, 81 and 82, which may be individually operated by the controls 83 to govern the flow of fluid under pressure to the cylinders 36, 46 and 73, respectively. The valve 80 is provided with a pair of outlets with which are connected pipe lines 84 and 85 which extend to the opposite ends of the cylinder 36. By this arrangement, fluid may enter either end of the cylinder 36 under pressure to impart the desired movement to the piston 37 therein, thereby advancing or retracting the pressure bar 39. Likewise, the valve 81 is provided with a pair of outlets with which are connected pipe lines 86 and 87 extending to the opposite ends of the cylinder 46, and the valve 82 is provided with a pair of fluid outlets joined with pipe lines 88 and 89 with the opposite ends of the scoop-tilting cylinders 73. These pipe lines leading from the valves 80, 81 and 82 terminate in flexible hose connections as indicated at 90, so that the same do not interfere with the turning movement of the mast 12 and the raising and lowering movement of the scoop arms 51.

A return line 91 leads from the group of valves 80, 81 and 82 to the accumulator tank 78. Thus when the valves 80, 81 and 82 are closed, which they normally are when the controls 83 thereof are released, the oil or other liquid discharge from the pump under pressure merely circulates past said valves, returning to the tank 78 by way of the line 91.

In view of the foregoing, it will be seen that the present invention provides an improved loading machine for use in many industrial capacities where bulk materials of various kinds are required to be elevated or transferred from one location to another. A practical advantage which my improved machine possesses is found in constructing the mast so that in addition to lifting the associated scoop in a vertical direction, the latter may be revolved about a substantially vertical axis to locate the same laterally of the machine. This feature provides for greater facility in operation and reduces maneuvering operations of the portable base, as is usually necessary in registering the scoop with respect to associated vehicles, or with other positions of material discharge. The power-driven turning mechanism for the mast is so constructed that it is locked against undue horizontal swinging movement by the use of the worm gearing. Also, the machine is further characterized by its mechanical simplicity and its ability to receive and handle heavy loads expeditiously and with complete control thereover, enabling the loaded scoop to have its contents discharged at any desired point within the working range of the machine.

I claim:

1. In a loading machine, a portable base vehicle having a power-furnishing and propelling engine, an upright mast structure supported on and adjacent to one end of said vehicle for turning movement about a substantially vertical axis, means driven by said engine for imparting controlled turning movement to said mast structure, a cross member mounted for horizontal sliding movement on said mast structure, a pair of thrust arms having their rear ends pivotally secured to said cross member for swinging movement about a substantially horizontal axis, a load carrier pivotally connected with the outer ends of said thrust arms for turning movement about a substantially horizontal axis, fluid pressure means mounted on said arms and connected with said load carrier to oscillate the latter between its material-receiving and discharging positions, a second fluid pressure means carried by said mast structure and connected with said cross member to impart a forward thrusting movement to said arms and load carrier, a third fluid pressure means carried by said base vehicle cooperative with said load carrier and supplementing said second pressure means for imparting forward thrust movement to said carrier when the latter is in a lowered material-receiving position, and means driven by said engine and trained through said mast structure for raising and lowering said thrust arms and carrier by swinging the thrust arms about their pivotal connections with said cross member.

2. In a loading machine, a portable base vehicle having a power-furnishing and propelling engine, a supporting frame mounted on and adjacent to one end of said vehicle, an upright mast structure supported for turning movement about a substantially vertically disposed axis in connection with said frame, means driven by power furnished by said engine for imparting controlled turning movement to said mast structure, a cross member mounted for horizontal sliding movement in a confining guide formed with said mast structure, a thrust member having its rear end pivotally secured to said cross member for swinging movement about a substantially horizontal axis, a load carrier pivotally connected with the outer end of said thrust member for turning movement about a substantially horizontal axis, means operable by power furnished from said engine and connected with said cross member to impart a forward thrusting movement thereto and said load carrier when the latter is in its material-receiving position, means operated by power supplied by said engine for raising and lowering said thrust member and load carrier, means mounted on said thrust member and operated by power developed by said engine for oscillating said load carrier about its pivotal connection with the outer portions of said thrust member, and additional means carried by said base vehicle below said mast structure and cooperative with said load carrier and actuated by power furnished from said engine for imparting forward thrust movement to said carrier when the latter is in a lowered material-receiving position.

3. In a loading machine, a portable base vehicle having a power-furnishing and propelling engine, a vertical tubular column rotatably supported in bearings carried by said base vehicle, an upright mast structure supported in connection with said bearings for turning movement about the vertical axis of said column, a worm gear turnable about the vertical axis of said column and with which said mast structure is connected, a boom projecting forwardly from said mast structure, a sliding union between the inner end of said boom and said mast structure, a load carrier pivotally mounted for turning movement on the outer end of said boom, a drum mounted on said vehicle and driven by power furnished from said engine, a cable connected with said drum, guide devices carried by said column and mast structure over which intermediate portions of said cable are trained, the outer end of said cable being connected with said boom, a hydraulic pump driven by said engine, a hydraulic ram mounted on said mast structure and united with said pump for imparting forward sliding movement to said boom, means driven by said engine for rotating said worm gear and mast structure, a bracket connected with said worm gear for turning movement in unison therewith, a second hydraulic ram mounted on said bracket and united with said pump for imparting forward thrusting movement to said load carrier independently of forward movement on the part of said vehicle, and a third hydraulic ram mounted on said boom and pivotally connected with said load carrier to produce turning movement of the latter with respect to said boom.

4. In a loading machine as set forth in claim 3 in combination with manually operated control valves for governing selectively the flow of fluid under pressure from said pump to said rams.

5. An automotive loading machine, comprising a portable engine driven wheeled frame, an upright mast structure supported on one end of said frame for turning movement about a substantially vertical axis, a cross member mounted for horizontal sliding movement in guides carried by said mast structure, spaced forwardly extending arms pivotally mounted at their rear ends on said cross member for turning movement in substantially vertical planes, power actuated cable means connected with said arms and extending over guide devices carried by said mast structure to said wheeled frame for effecting raising and lowering movement of said arms, a load carrier pivotally mounted on the outer ends of said arms for turning movement about a substantially horizontal axis, a fluid-actuated ram carried by the forward part of said frame beneath said mast structure and engageable with said load carrier to impart forward thrusting movement thereto relative to said frame, and a complemental fluid-actuated ram mounted on said mast structure and cooperative with said cross member and arms to impart forward thrusting movement thereto in conjunction with said first-named ram.

6. An automotive loading machine, comprising a portable engine driven wheeled frame, an upright mast structure supported on one end of said frame for turning movement about a substantially vertical axis, a cross member mounted for horizontal sliding movement in guides carried by said mast structure, spaced forwardly extending arms pivotally mounted at their rear ends on said cross member for turning movement in substantially vertical planes, power actuated cable means connected with said arms and extending over guide devices carried by said mast structure to said wheeled frame for effecting raising and lowering movement of said arms, a load carrier pivotally mounted on the outer ends of said arms for turning movement about a substantially horizontal axis, a fluid-actuated ram carried by the forward part of said frame beneath said mast structure end engageable with said load carrier to impart forward thrusting movement thereto relative to said frame, a complemental fluid-actuated ram mounted on said mast structure and cooperative with said cross member and arms to impart forward thrusting movement thereto in conjunction with said first-named ram, and a third fluid-actuated ram carried by said arms cooperative with said load carrier for turning the latter about its pivotal connections with said arms between load-carrying and dumping positions.

7. An automotive loading machine, comprising a portable engine driven wheeled frame, an upright mast structure supported on one end of said frame for turning movement about a substantially vertical axis, a cross member mounted for horizontal sliding movement in guides carried by said mast structure, spaced forwardly extending arms pivotally mounted at their rear ends on said cross member for turning movement in substantially vertical planes, power actuated cable means connected with said arms and extending over guide devices carried by said mast structure to said wheeled frame for effecting raising and lowering movement of said arms, a load carrier pivotally mounted on the outer ends of said arms for turning movement about a substantially horizontal axis, a fluid-actuated ram carried by the forward part of said frame beneath said mast structure and engageable with said load carrier to impart forward thrusting movement thereto relative to said frame, a complemental fluid-actuated ram mounted on said mast structure and cooperative with said cross member and arms to impart forward thrusting movement thereto in conjunction with said first-named ram, a third fluid-actuated ram carried by said arms cooperative with said load carrier for turning the latter about its pivotal connections with said arms between load-carrying and dumping positions, and manually operated valve means on said frame for controlling the actuation of each of said rams.

EUGENE BARKER.